Patented Apr. 30, 1946

2,399,161

UNITED STATES PATENT OFFICE 2,399,161

PROCESS FOR PRODUCING GLUES AND ADHESIVES FROM KERATIN PROTEIN MATERIALS

George H. Brother and Charles H. Binkley, Berkeley, Calif., assignors to Claude R. Wickard, as Secretary of Agriculture of the United States of America, and his successors in office No Drawing. Application June 30, 1942, Serial No. 449,180

2 Claims. (Cl. 106—155)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

This invention relates to the use of keratin protein materials, and has among its objects the production of glues or adhesives from such materials; the utilization of waste keratin material, such as feathers, hair or hoofs, in the preparation of adhesives; the production of adhesives and glues from mixtures of waste keratin materials with known adhesives, such as blood, casein, bone glue or hide glue, thereby reducing the cost of the adhesive without reducing the quality; and the utilization of waste or low grade keratin materials, alone or in mixture with other glue materials, in the preparation of adhesives suitable for use with plywood, corrugated paper, cardboard, and the like.

Keratin materials, such as horn, hoof, hair, feathers, etc., are known to be the most permanent and stable form of protein material. Structurally they differ from albumins, such as egg and blood, and from globulins, such as casein, soybean protein, peanut protein, etc., by consisting of extended fiber-like molecular chains, oriented normal to the fiber axis, as shown by X-ray diffraction patterns. Chemically these materials are so stable and resistant to change that it has not been possible heretofore to disperse them in useful forms without so breaking them down as to render the resultant product of little practical value as glues or adhesives.

Previous attempts to prepare adhesives from keratins have used such processes as treating materials, such as horn, hoof, hair, and so forth, with steam at high pressures (3 to 4 atmospheres) for several hours; heating the dry material at high pressures and temperatures for extended periods; heating under high pressure with aqueous alkaline solutions; treating with caustic solution at or near 212° F.; and treating with strong caustic solution.

All these methods employed for the dispersion of keratin protein material for adhesives are extremely violent and excessive break-down in the structure of the protein molecule results. That this is the case is indicated by the well known fact that evolution of hydrogen sulphide accompanies heating keratin with steam under pressure for extended periods. Under these conditions, the production of glues having good strength is not possible.

Our invention produces a product different from any produced before in that the keratin protein is not excessively broken down by our treatment, so adhesives produced from it are strong and resistant. It is therefore possible to utilize keratin protein materials such as chicken feathers, hog bristles, hoof and horn meal and the like, which are for the most part waste material and for which no satisfactory use has been developed.

In order to produce adhesives which fulfill the objectives of this invention and which may be applied in the art to advantage, the following general procedure must be followed: Dry keratin material, such as chicken feathers, hog bristles, hair, hoof or horn shavings, is mixed with sodium sulphide and caustic soda solutions of not over 2.5% concentration and heated in an autoclave at a moderate pressure for a few minutes. The product may be filtered to produce a liquid glue, but it is usually dried in thin films (30 g. per sq. ft.) by circulating air at not above 104° F. If dried in much thicker films or at higher temperatures, the dry glue powder will not readily redisperse in water. When dried to 8–12% moisture content the glue flakes are reduced to powder in ball mills, screened through 100 mesh screens to remove any undispersed keratin and the powder is ready for adhesive application. This powder, if kept dry (8–12% moisture content), will not deteriorate, so may be stored until needed. To prepare the adhesive, it is used alone or mixed with dried blood, casein glue, animal glue or other glue material and stirred into water to give a glue of the desired viscosity.

If mixed with blood, the mixing may take place before the keratin is dried in films. The dried blood need not be the refined product, but the cheapest grade of fertilizer blood. Mixing with casein glue can best be effected in the powdered state, but mixing with bone or hide glue requires special precautions, as will be shown. Mixtures of keratin glue with blood or casein glues will be found after setting-up to have as good strength and water resistance as the unmixed commercial material. Mixtures of keratin glue with bone or hide glues may be made to show about as rapid set on paper or cardboard and the water resistance is much superior to that of bone or hide glue.

In order to more clearly illustrate our invention, the following examples are given. It has been found that somewhat different treatments are necessary to produce dispersions from poultry body feathers, quills, hog bristles and cattle or horse hoof material. All are within the limits of the general procedure as outlined above, but there are differences in detail, which will be shown in specific examples. It is to be understood that these examples are for the purpose of illustrating the invention and are not in any sense to be taken as restricting its scope.

*Example 1.*—200 grams of chicken body feathers is worked into 1000 ml. of a solution that is 1% caustic soda and 0.5% sodium sulfide (60% fused, the so-called double strength). A wetting agent, such as "Tergitol Penetrant 7" (a higher sodium alkyl sulphate, specifically, 3,9 diethyl tridecame-6 sodium sulphate), may be used to facilitate wetting the feathers with the solution. The mixture is heated to 80° C. and maintained at 80° to 90° C. on a steam bath for 20 minutes, while being continuously stirred. The resulting digest is dried as a thin film (30 grams per square foot) on a glass plate at room temperature (25° C.). The dried film is reduced to a powder in a ball mill and this is screened through a 100 mesh screen to separate the glue powder from the undigested portions. A working glue is prepared by mixing 40 grams of this powdered glue with 100 ml. water, allowing to stand about an hour, then again thoroughly stirring before applying. The viscosity is within the range of that of average joint and plywood glues. The pH is about 10.5. Plywood is prepared by applying the glue to wood veneers and pressing these at 200 pounds per square inch for 5 minutes at 105° C., then cooling under pressure. When allowed to set over night, the glue line shows strength comparable with that of commercial plywood. It is not water resistant enough to comply with the Bureau of Standards test CS 45-40 (1940), for moisture resistant plywood.

*Example 2.*—200 grams of chicken quill feathers is worked into 1000 ml. of a 1% sodium sulfide (60% fused) solution, with or without the presence of a wetting agent, and the mixture is heated for 30 minutes in an autoclave at 18 pounds steam pressure. 50 ml. of a 20% caustic solution is then added and the mixture is maintained at 80° to 90° C. for 15 minutes and constantly stirred. The digest is dried in a film, as in Example 1, and the working glue is prepared from the powder similarly. It has a somewhat lower viscosity than the glue of (1) and in consequence better spread. The pH is about 10.5. It may be used with fair results as a cold glue. It produces a stronger plywood with wood veneers, united in a hot press as in (1). The glue line is not water resistant when first made, but after about six weeks it becomes resistant enough to pass the Bureau of Standards test CS 45-40 (1940).

*Example 3.*—200 grams of mixed body and quill chicken feathers is worked into 1000 ml. of a 1% sodium sulfide (60% fused) solution, with or without the presence of a wetting agent, and the mixture is heated for 30 minutes in an autoclave at 18 pounds' pressure. 50 ml. of a 20% caustic solution is then added and the mixture thoroughly stirred. It is further heated for 5 minutes in the autoclave at 7 pounds' pressure. The digest is dried in films, powdered and screened, as in Example 1. The working glue is prepared by stirring 40 grams of the powdered glue into 100 ml. of water. The pH is about 10.5, and the viscosity and spreading properties are comparable to those of average casein glues. Wood veneers united as in Example 1 are found to have about the strength as those united with average casein glues, when set over night, but on ageing, the strength increases, as does the water resistance, until after 6 weeks, the plies will pass the Bureau of Standards test CS 45-40 (1940) for commercial plywood.

*Example 4.*—200 grams of slaughter house hog bristles, dry but not cleaned, is autoclaved in 1000 ml. of a 1.5% sodium sulfide (60% fused) solution at 18 pounds' pressure for 30 minutes. 50 ml. of a 20% caustic solution is added with thorough stirring and the autoclaving is continued for 7 minutes at 7 pounds' pressure. The digest is dried at room temperature (25° C.) under forced draft, in thin films (30 grams per square foot), powdered in a ball mill and screened through 100 mesh screen. The glue is prepared by mixing 40 grams of the glue powder with 100 ml. water. It has about the consistency of average casein glues and a pH of about 10.2. The glue line of veneers united as described in Example 1 is comparable to that of Example 2.

*Example 5.*—200 grams of shredded fresh hoof material is mixed with 1000 ml. of a 1% sodium sulfide (60% fused) solution and heated 30 minutes in an autoclave at 18 pounds' pressure. 50 ml. of a 20% caustic solution is stirred in and the autoclaving is continued for 7 minutes at 7 pounds' pressure. The resultant digest is dried in thin films, which is pulverized and screened as in Example 1. Working glue is prepared by mixing 40 grams of the glue powder with 50 ml. of water. It spreads well, is smooth, in tackiness it resembles the best casein glues and has a pH of around 11.0. Wood veneer united in a hot press, as described in Example 1, indicated a stronger glue line after only an hour set than when united with average casein glue. It may also be used to advantage as a cold glue. Water resistance of fresh glued unions is not up to standard, but is improved by further set.

*Example 6.*—200 grams of calcined hoof meal, the hoof meal of commerce, treated as in Example 5, produces a glue with pH of about 10.0, spread inferior to that of (5), strength of glue line, fair, and water resistance poor.

*Example 7.*—A mixed leather digest is prepared as described in Example 3. To this is added 200 grams of dried fertilizer blood and the mixture is spread in thin films (30 grams per square foot) to dry as described. The powder is prepared and screened as described. The working glue is prepared by mixing 50 grams of the glue powder with 100 ml. of 1% NaOH with thorough stirring. The spread is fair. The pH is about 12.2. This material is not suitable for cold gluing, but produces glue lines with wood veneers, united by hot pressing as described in Example 1, that are equal in strength and in water resistance to those produced by average casein glues.

*Example 8.*—Equal parts by weight of the powdered feather glue described in Example 3, and dried fertilizer blood are thoroughly mixed dry. 45 grams of this mixed powder is mixed with stirring with 100 ml. of a 1% aqueous caustic solution, allowed to stand an hour, then thoroughly stirred to produce a working glue. This has a fair spread, although inclined to be somewhat granular and has a pH of about 11.5. Glue lines produced with it in plywood veneers united in a hot press as described in Example 1, are nearly as strong as those of average casein glues and have a water resistance comparable to that of casein glues, by Bureau of Standards CS 45-40 (1940) test.

*Example 9.*—Equal parts by weight of the powdered feather glue described in Example 3, and a commercial casein glue are mixed dry. 40 grams of this mixed powder is stirred into 85 ml. of water, allowed to stand 30 minutes, then thoroughly stirred to produce a working glue. This has about the same viscosity and spread as the casein alone and has a pH of about 12.0. Used either hot or cold, this mixture produces glue lines comparable in strength and water resistance to those of the casein glue alone. This glue is still workable after standing 24 hours, but the strength of glue lines is lower.

*Example 10.*—Equal parts by weight of the powdered hog bristle glue described in Example 4 and dried fertilizer blood are mixed dry. 45 grams of this mixture is stirred into 100 ml. of a 1% aqueous caustic solution, allowed to stand an hour, then thoroughly stirred to produce a working glue. This has about the same viscosity and spread of average casein glue and has a pH of about 11.5. It can be used for hot pressed gluing only. It produces glue lines comparable with those of average casein glues in strength and water resistance.

*Example 11.*—Equal parts by weight of the powdered hog bristle glue described in Example 4, and commercial casein glue are mixed dry. 40 grams of this mixture is stirred into 85 ml. of water, allowed to stand 30 minutes, then thoroughly stirred to produce a working glue. This has about the same viscosity and spread as the casein alone and has a pH of about 11.0. Strength of glue lines and characteristics are similar to those of the glue described in Example 9.

*Example 12.*—Equal parts by weight of the powdered hoof meal glue described in Example 6, and dried fertilizer blood are mixed dry. 45 grams of this mixture is stirred into 100 ml. of a 1% aqueous caustic solution, allowed to stand an hour, then thoroughly stirred to produce a working glue. This is not as smooth and does not have as good spread as the glue of Example 6, and has a pH of 11.0 to 11.5. The strength of hot glue lines produced as described in Example 6, are about comparable to those for average casein glues, and the water resistance is comparable to that of very good casein glues.

*Example 13.*—Equal parts by weight of the powdered hoof meal glue described in Example 6, and commercial casein glue are mixed dry. 40 grams of this mixture is stirred into 90 ml. of water, allowed to stand 30 minutes, then thoroughly stirred to produce a working glue. This has a viscosity and spread comparable to casein glue and has a pH of about 11.5. The strength of glue lines and water resistance are equal to or possibly a little better than those described in Example 12.

*Example 14.*—40 grams of a commercial bone glue is dissolved in 40 ml. water at 140–150° F. in accordance with usual procedure. This glue solution is cooled to about 104° F. and at this temperature is mixed with the working glue solution of Example 5, containing 40 g. keratin. The mixture is heated to 140–150° F. for application. The viscosity is a little greater than that of the bone glue alone. The pH is about 10.0. If used as paper adhesive, the set is nearly equal to that of bone glue alone. After application and setting, if the paper joints are cured for 45 minutes at 176° F., water resistance is developed to the extent that the paper fails before failure of the glue line.

*Example 15.*—40 grams of a commercial hide glue is dissolved in 80 ml. water at 140–150° F. in accordance with usual procedure. This glue is cooled and mixed as in Example 14 with the working glue solution of Example 3. Viscosity of mixture at 140–150° F. and the pH is about the same as that of Example 14. It is to be noted that the glue-water ratio here is 80–180 as compared to that of 80–90 for Example 14. The glue set on paper, as well as the developed water resistance, is, however, about the same.

It is to be noted that, although glues with good properties may be produced with commercial products readily available, such as dried fertilizer blood and hoof meal, better products may result if this material is processed for glues in the fresh condition. In this way detrimental treatment of the keratins, such as excessive heating, necessary to the economical production of present commercial products, may be eliminated.

Although the keratins investigated as described in this specification are limited to chicken feathers, hog bristles and hoof material, there is no intention to so limit the scope. Chicken feathers may be considered as merely indicative of what may be expected with feathers from any fowl or bird; with hog bristles, with any hair or fur, including wool, human or animal hair; with roof material; and horn or any other animal horny scale material. All of these materials are classed as keratins and are proteins with oriented molecular configuration favorable for fiber structure, as shown by X-ray diffraction patterns. These proteins are exceptionally stable and resistant to the action of recognized dispersing agents.

Having thus described this patent, what we claim for Letters Patent is:

1. A process for the production of a powdered adhesive comprising reducing a native keratin in an aqueous alkaline sulfide solution of about from 0.5 per cent to 1.5 percent concentration, dispersing the reduced product in a caustic soda solution of about 1.0 percent concentration, drying the resulting liquid at a temperature not above about 104° F., and reducing the dried product to a powder.

2. A process for the production of a powdered adhesive comprising reducing a native keratin in an aqueous alkaline sulfide solution of about from 0.5 percent to 1.5 percent concentration, dispersing the reduced product in a caustic soda solution of about 1.0 percent concentration, drying the resulting liquid in films by circulating air at a temperature not above about 104° F., and reducing the dried product to a powder.

GEORGE H. BROTHER.
CHARLES H. BINKLEY.